United States Patent
Boccuzzi et al.

(10) Patent No.: US 6,272,908 B1
(45) Date of Patent: Aug. 14, 2001

(54) FLEXURAL PROBE AND METHOD FOR EXAMINING A MOVING SENSITIVE WEB SURFACE

(75) Inventors: Theodore R. Boccuzzi, Penfield; Robert Kerprich, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/274,726

(22) Filed: Mar. 23, 1999

(51) Int. Cl.[7] .................................................. G01B 5/28
(52) U.S. Cl. .................................................. 73/105; 73/159
(58) Field of Search .................................. 73/866.5, 159, 73/150 R, 37.7, 105

(56) References Cited

U.S. PATENT DOCUMENTS

| | | | |
|---|---|---|---|
| 3,339,845 | * 9/1967 | Bond | 73/37.7 |
| 3,470,739 | * 10/1969 | Takafuji et al. | 73/159 |
| 4,063,051 | * 12/1977 | Gundlach et al. | . |
| 5,317,913 | * 6/1994 | Feistkorn et al. | 73/159 |
| 5,659,968 | * 8/1997 | Leifeld | 73/159 |
| 5,934,140 | * 8/1999 | Jackson et al. | 73/159 |
| 5,939,624 | * 8/1999 | Smith | 73/105 |

\* cited by examiner

*Primary Examiner*—Robert Raevis
(74) *Attorney, Agent, or Firm*—Clyde E. Bailey, Sr.

(57) ABSTRACT

A flexural assemblage and method for inspecting a highly sensitive surface using a probe flexibly fixed in close proximity to the sensitive surface pivots away from the moving web surface when a surface protuberance contacts the probe. An armature element of the flexural assemblage contains one or more probes. The armature is biased against movement, but the force of the moving protuberance when contacting the probe overcomes the bias and pivots the probe and armature away before damage results to the web surface or web carrier.

7 Claims, 5 Drawing Sheets

FLEXURAL PROBE AND METHOD FOR EXAMINING A MOVING SENSITIVE WEB SURFACE

FIELD OF THE INVENTION

The invention relates generally to the field of process measurement devices, and in particular to a flexural probe and method for examining sensitive web on a finished cast surface. More specifically, the invention relates to an assemblage for mounting probes, such as optical, chemical and physical probes, in close proximity to a web, such as film, conveyed on a highly polished surface that avoids causing damage to the surface.

BACKGROUND OF THE INVENTION

A variety of methods exist for casting materials of various sorts onto a moving substrate. In the photographic film manufacture process it is conventional practice to cast, for instance, cellulose acetate films by a solvent cast method. In the solvent cast method a solution of cellulose acetate in a solvent is poured onto a moving casting surface. After sufficient evaporation of the solvent, the cellulose acetate film is peeled from the casting surface. A near infra-red (NIR) gauge is used for measuring the solvent content of the acetate film while on the casting surface. For measurement purposes, the NIR gauge needs to be mounted about 0.250 inches to about 0.375 inches away from the casting surface. The casting surface has a mirror finish and can easily be damaged. Protuberances or obstructions on film exceeding the dimensions of the spacing between the gauge and casting surface are caught between the NIR gauge and the casting surface. This generally results in damage to the finish of the casting surface and to the probe.

While there are no known attempts to solve the specific problem confronted by Applicants, U.S. Pat. No. 4,865,872, titled "Strip Inspecting Apparatus and Associated Method" by Pellatiro, Sep. 12, 1989, discloses a strip inspection apparatus wherein a linear sensor array is positioned above the surface of a strip for determining the position of the strip edges. Further, U.S. Pat. No. 4,797,301, titled "Method of and Apparatus for Applying a Fluid to a Bulk Commodity" by Ardley et al., Jan. 10, 1989 discloses a combination pivotally mounted apparatus for applying a fluid and for monitoring the thickness thereof to a material being conveyed. An obvious shortcoming of each of the aforementioned devices for solving Applicants' problem is that neither provides for a flexural assemblage that yields to contact by a surface protuberance thereby avoiding damage to the surface undergoing inspection.

Therefore, a need persists for a flexural probe assemblage for examining a sensitive web surface that can be arranged very close to the sensitive surface and can then pivot away from the sensitive surface when engaged by a protuberance on the surface without causing damage to the surface.

SUMMARY OF THE INVENTION

It is, therefore, an object of the present invention to provide a flexural assemblage that examines a moving web without causing damage to the finished surface conveying the web.

It is another object of the invention to provide a flexural assemblage for examining a web that is pivotally urged away when in contact with a surface undulation.

It is still another object of the invention to provide a flexural assemblage that can mount a plurality of probes for examining a web without damaging the surface.

Yet another object of the invention is to provide a flexural assemblage having an armature with a plurality of probes containing receptacles for selectively inspecting a predetermined location along a moving web.

It is a feature of the invention that a pivotally mounted armature containing at least one probe has an active end spaced in close proximity to a moving web defining the inspection position. The armature and the probe are configured to pivot away from the moving web when engaged by a protuberance on the surface of the web and then to return to the surface examining position.

To accomplish these and other objects and features of the invention, there is provided in one embodiment of the invention, a flexural assemblage for examining a moving web having protuberances thereon, comprising:

a rigid frame;

an armature mounted for pivotal movements in said frame;

at least one probe fixedly mounted in said armature, said at least one probe having an active end arranged in close proximity to said moving web; and means for pivoting said armature and said at least one probe about a fixed axis away from said moving web, said armature and said at least one probe being urged pivotally from a surface examining position wherein said active end of said at least one probe is directed toward said moving web, to an inactive probe position wherein said active end of said at least one probe is directed away from said moving web and said protuberance, said inactive probe position being defined when said at least one probe has made slight contact with said protuberance on said moving surface.

In another aspect of the invention, a method for examining a moving surface, comprises the steps of:

providing a flexural assemblage for mounting at least one probe in a surface examining position relative to said moving surface, said at least one probe having an active end for examining said moving surface;

providing a movable surface to be examined in a plane of travel spaced in close proximity to said active end of said at least one probe;

activating said movable surface for movement along said plane of travel relative to said at least one probe;

providing means for flexibly urging said assemblage having said at least one probe away from said moving surface in response to slight engaging contact with a protuberance on said moving surface and then returning said at least one probe to said surface examining position;

urging said assemblage away from said moving surface when said at least one probe engagably contacts said protuberance; and returning said assemblage to said surface examining position with said at least one probe positioned in close proximity to said moving surface.

It is, therefore, an advantageous effect that the armature of the invention allows for the mounting of sensors very near a moving sheet of film that has been cast on a mirror finish surface. Furthermore, the armature has the advantage of preventing damage to the casting surface by its ability to instantly break-away to let the obstruction pass and return to its original position.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
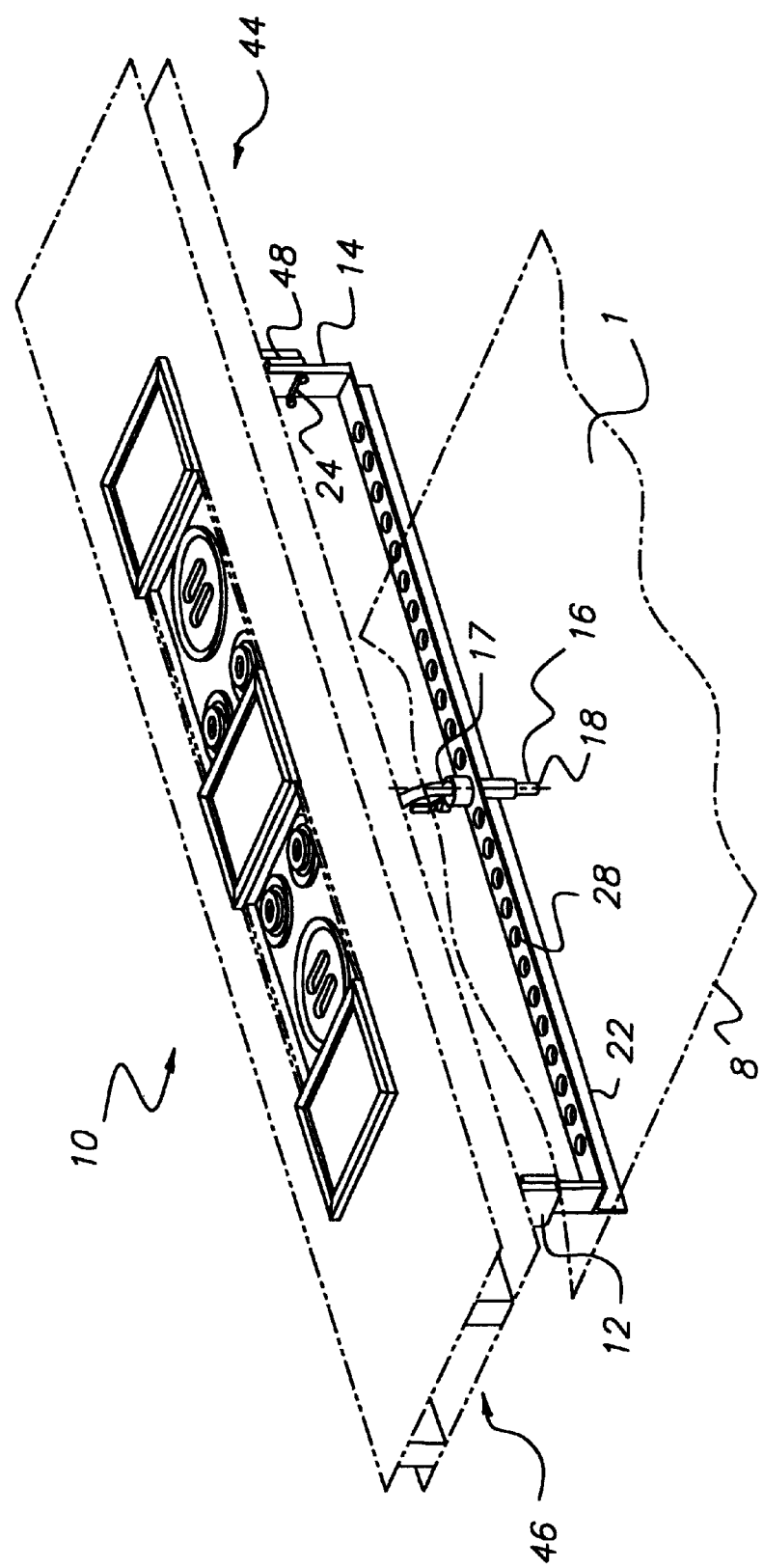
FIG. 1 is a perspective view of the assemblage of the invention.
Figure 2:
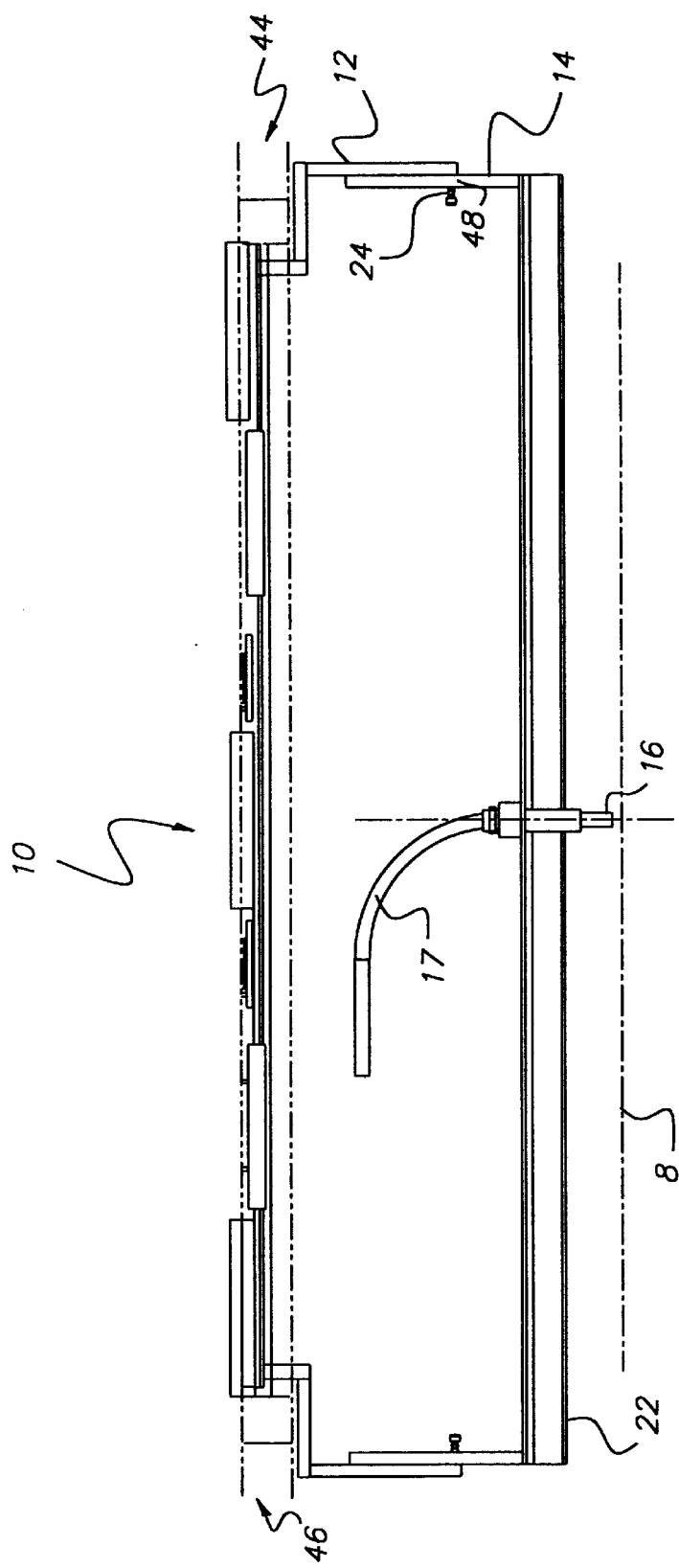
FIG. 2 is a front elevated view of the assemblage with the probe in the web inspection position.
Figure 3:
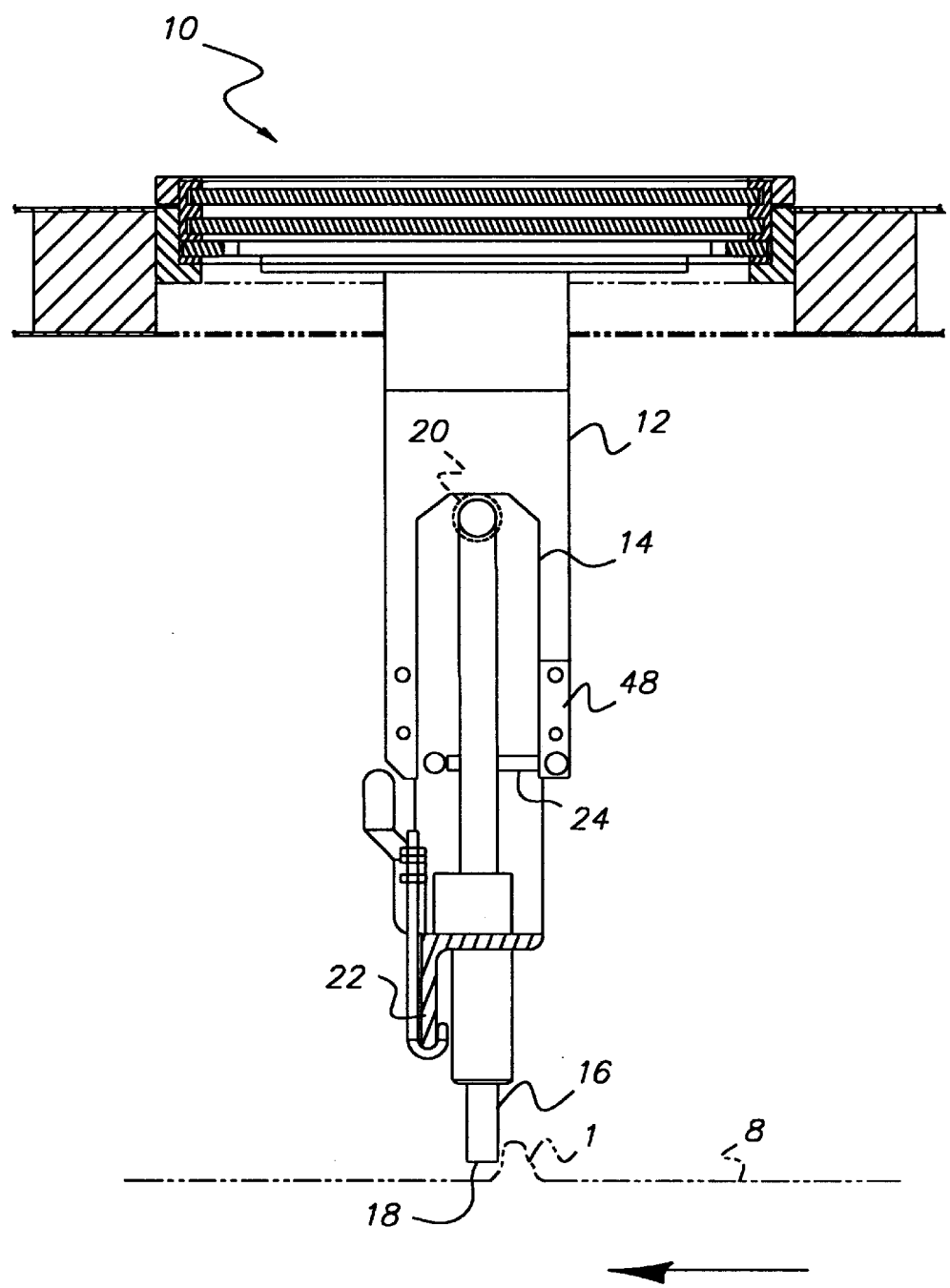
FIG. 3 is a front elevational view of the assemblage with the probe engaging a surface protuberance.

Turning now to the drawings and in particular to FIGS. 1–4, the flexural assemblage 10 for examining a highly sensitive web 8, such as an acetate film, has a rigid frame 12 and a retractable armature 14 pivotally arranged in frame 12 for mounting at least one probe 16. Retractable armature 14 containing probe 16 is configured to pivot away (as described below) in response to slight contact with a protuberance 1 on the surface of the moving web 8 being examined. Probe 16, having a conduit 17 connecting to an active end 18 extending downwardly beyond armature 14, may include any one of an optical, chemical and physical sensors that are generally used for measuring a variety of properties along the moving web 8. It is contemplated that one probe 16 is preferred for use primarily because of cost but certainly armature 14 can accommodate more than one probe 16.

Figure 4:
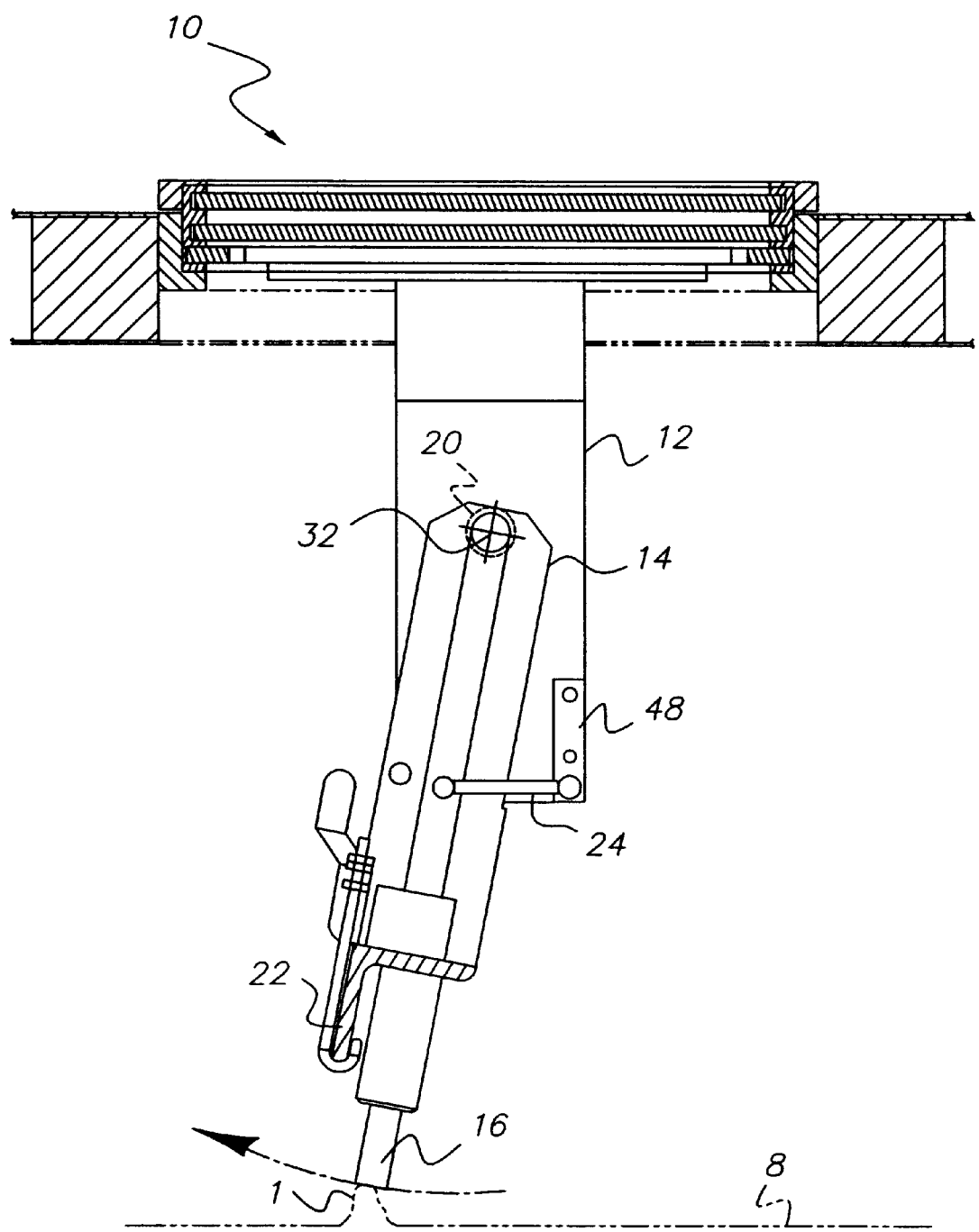
FIG. 4 is a front elevational view of the assemblage showing the probe in a pivoted position away from the moving web.

Referring to FIG. 4, armature 14 (or bracket) is configured so that it allows the probe 16, such as an NIR gauge, to automatically swing away from the highly sensitive web 8 upon slight contact with the protuberance 1. (The arrow in FIG. 4 denotes the travel direction of the moving web.) The impact of the protuberance 1 to the probe 16 is sufficient to overcome a bias on the armature 14 thereby releasing the armature 14 and probe 16 to pivot away from the protuberance 1 in the direction of web travel. Once the protuberance 1 has passed the probe 16 or gauge, the armature 14 or bracket returns the gauge back to its original position. Pivotable armature 14 utilizes roller bearings 20, a counter balance 22, and springs 24, as described below, to achieve its pivoting movements. Armature 14 prevents the obstruction from damaging the casting surface (not shown) upon which the moving web 8 rides.

Referring to FIG. 1, probe receptacles or holders 28 that secure the probe 16 (may include a sensor or a gauge) in the armature 14 can be modified to accommodate a variety of sensor types, for instance, optical, chemical, and physical. Receptacle 28 may contain a probe biasing member (not shown) to secure the probe 16 in a fixed position or an oversized sleeve or collar (not shown) may surround the probe 16 for force fitting into receptacle 28 in armature 14. We have successfully used a chemical probe to determine component concentration in the moving web 8.

Figure 5:
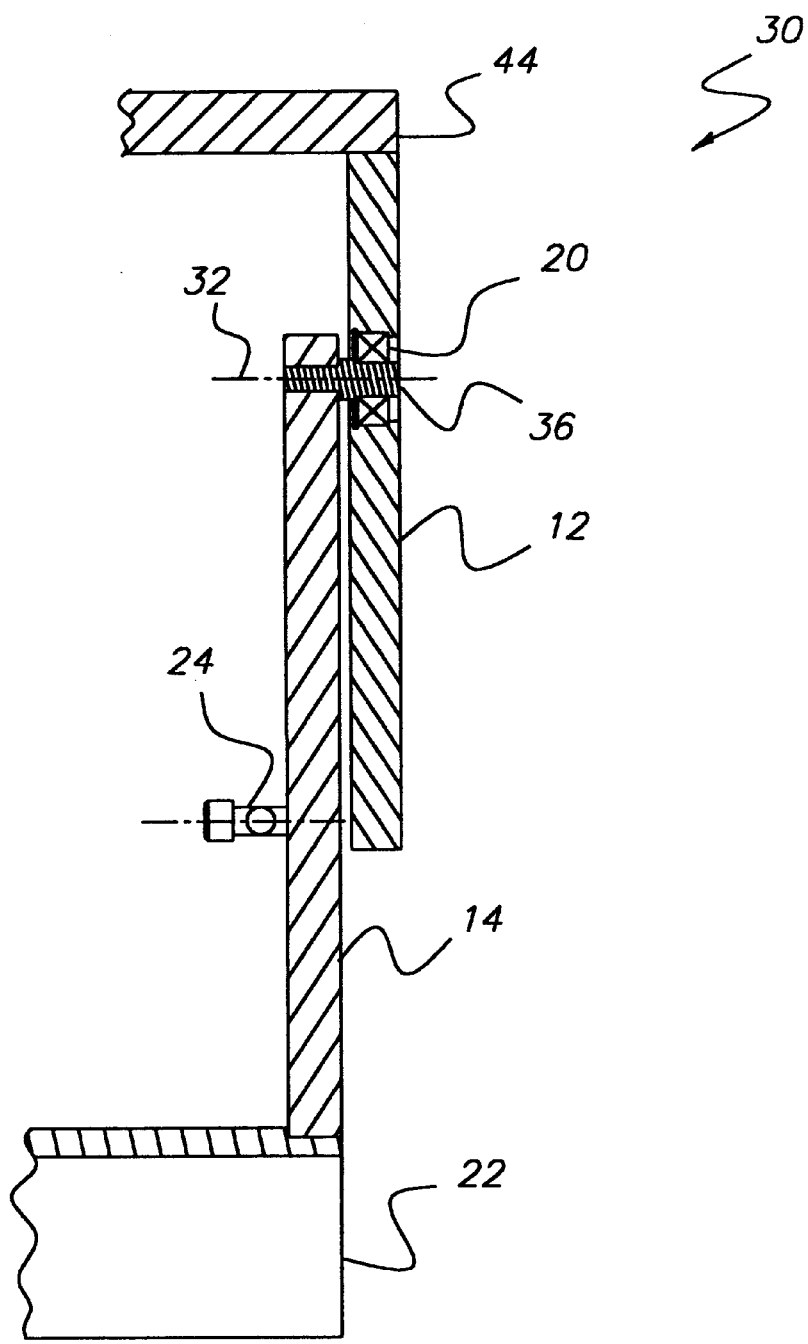
FIG. 5 is a partial section of the pivoting mechanism shown in FIG. 2.

Referring to FIG. 5, means 30 for pivoting the armature 14 and the probe 16 about a fixed axis 32 away from the moving web 8 is illustrated. In our preferred embodiment, means 30 comprises a pair of end shafts 36, 38 (only one of the pair of end shafts 36 is shown) journaled for rotation through at least one substantially identical roller bearing 20. Roller bearings 20 are arranged on each of the end shafts 36, that are supported in the frame 12. A biasing member, preferably a spring 24 is biased against opposite ends 44, 46 of armature 14 for allowing the armature 14 and probe 16 to pivot away from the moving web 8 and urging it to then return to the surface examining position (shown in FIGS. 1 and 2) above the moving web 8. In this position, the active end 18 of the probe 16 is directed toward the moving web 8 for examining predetermined properties of the moving web 8, such as element content, surface thickness, etc.

Referring to FIGS. 1–5, in an alternative embodiment, a stop member 48 is arranged in the frame 12 for locating the armature 14 and the probe 16 in the surface examining position. Alternatively, stops (not shown) may be arranged on armature 14 for contacting the frame 12 after some predetermined angle of rotation.

According to FIG. 4, in operation, armature 14 and probe 16 are urged pivotally from a surface examining position wherein the active end 18 of the probe 16 is directed toward the moving web 8 to an inactive probe position. In the latter position, the active end 18 of the probe 16 is directed away from the moving web 8 and the protuberance 1. In our invention, the inactive probe position is defined when the probe 16 has made slight contact with a protuberance 1 on the moving web 8.

The invention has been described with reference to a preferred embodiment. However, it will be appreciated that variations and modifications can be effected by a person of ordinary skill in the art without departing from the scope of the invention.

---

| PARTS LIST | |
|---|---|
| 1 | protuberance |
| 8 | web |
| 10 | assemblage |
| 12 | rigid frame |
| 14 | retractable armature (bracket) |
| 15 | opening in armature 14 |
| 16 | at least one probe (gauge, sensor) mounted in armature 14 |
| 17 | conduit |
| 18 | Active end of probe 16 |
| 20 | roller bearings |
| 22 | counter balance |
| 24 | springs |
| 28 | probe receptacles or holders |
| 30 | pivoting means |
| 32 | axis |
| 36 | end shaft |
| 38 | end shaft |
| 42 | biasing member |
| 44 | opposite ends of armature 14 |
| 46 | opposite ends of armature 14 |
| 48 | stop member |

What is claimed is:

1. A flexural assemblage for examining a moving web having protuberances thereon, comprising:

a rigid frame;

an armature;

means for mounting said armature for pivotal movements in said frame;

at least one probe fixedly mounted in said armature, said at least one probe having an active end arranged in close proximity to said moving web at a distance such that the probe contacts the moving web only at a protuberance, said armature and said at least one probe pivoting about a fixed axis between a surface examining position wherein said active end of said at least one probe is in close proximity to said moving web, to an inactive probe position wherein said active end of said at least one probe is pivoted away from said moving web in response to said at least one probe making slight contact with a protuberance on said moving web; and means for urging said frame and probe toward said surface examining position.

2. The flexural assemblage recited in claim 1, wherein said means for mounting comprises a shaft and a bearing.

3. The flexural assembly recited in claim 1, wherein said means for urging comprises a spring connected between said fiame and said armature.

4. The flexural assembly recited in claim 3, further comprising a stop member located on said frame for contacting said armature to stop said armature at said web examining position against the urging of said spring.

5. The flexural assemblage recited in claim 1, wherein a stop member is arranged in said frame for limiting said pivotal movements of said armature and said at least one probe away from said moving web.

6. A method for examining a moving web having protuberances thereon, comprising the steps of:

mounting at least one probe having an active end arranged in close proximity to said moving web for pivoting about a fixed axis between a web examining position wherein said active end of said at least one probe is in close proximity to said moving web at a distance such that the probe contacts the moving web only at a protuberance, and an inactive probe position wherein said active end of said at least one probe is pivoted away from said moving web; and urging said probe toward said web examining position with a force sufficient to allow said at least one probe to pivot to said inactive position in response to said at least one probe making slight contact with a protuberance on said moving web and to return to said web examining position upon the passing of said protuberance.

7. The method recited in claim 6, further comprising the step of limiting the movement of said at least one probe away from the moving web.

\* \* \* \* \*